(12) United States Patent
Cha et al.

(10) Patent No.: US 12,731,733 B2
(45) Date of Patent: Sep. 8, 2026

(54) MULTILAYER CERAMIC CAPACITOR COMPRISING EXTERNAL ELECTRODES WITH A LONG BAND PORTION

(71) Applicant: SAMSUNG ELECTRO-MECHANICS CO., LTD., Suwon-si (KR)

(72) Inventors: Youngjun Cha, Suwon-si (KR); Chae Min Park, Suwon-si (KR); Seonho Kim, Suwon-si (KR); Yong-Won Seo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 147 days.

(21) Appl. No.: 18/415,009

(22) Filed: Jan. 17, 2024

(65) Prior Publication Data

US 2024/0312717 A1 Sep. 19, 2024

(30) Foreign Application Priority Data

Mar. 13, 2023 (KR) ........................ 10-2023-0032402

(51) Int. Cl.
*H01G 4/30* (2006.01)
*H01G 2/06* (2006.01)
(Continued)

(52) U.S. Cl.
CPC ............... *H01G 4/30* (2013.01); *H01G 2/065* (2013.01); *H01G 4/012* (2013.01); *H01G 4/224* (2013.01);
(Continued)

(58) Field of Classification Search
None
See application file for complete search history.

(56) References Cited

U.S. PATENT DOCUMENTS

2011/0309718 A1 12/2011 Ogawa et al.
2014/0085767 A1 3/2014 Kang
(Continued)

FOREIGN PATENT DOCUMENTS

JP 2012-004330 A 1/2012
JP 2018-018845 A 2/2018
(Continued)

OTHER PUBLICATIONS

Office Action issued on Jul. 1, 2026 in Korean Patent Application No. 10-2023-0032402 with English translation.

*Primary Examiner* — Eric W Thomas
(74) *Attorney, Agent, or Firm* — Morgan, Lewis & Bockius LLP

(57) ABSTRACT

A multilayer ceramic capacitor includes a ceramic body, a plurality of first and second internal electrodes having a dielectric layer therebetween in the ceramic body, first and second external electrodes including a body portion covering both end surfaces spaced apart from each other along a length direction of the ceramic body, respectively, a first band portion extending from the body portion and covering a part of a first surface of the ceramic body in a thickness direction, and a second band portion covering a part of a second surface facing the first surface and being longer than the first band portion, first and second cover layers that are disposed in the ceramic body along the thickness direction of the ceramic body, and a first cladding layer between the second cover layer, the second band portion of the first external electrode, and the second band portion of the second external electrode.

20 Claims, 7 Drawing Sheets

(51) Int. Cl.

| | |
|---|---|
| ***H01G 4/012*** | (2006.01) |
| ***H01G 4/224*** | (2006.01) |
| ***H01G 4/232*** | (2006.01) |
| *H01G 4/008* | (2006.01) |
| *H01G 4/12* | (2006.01) |

(52) U.S. Cl.

CPC ............. *H01G 4/232* (2013.01); *H01G 4/008* (2013.01); *H01G 4/12* (2013.01)

(56) References Cited

U.S. PATENT DOCUMENTS

| | | | | |
|---|---|---|---|---|
| 2015/0077898 | A1* | 3/2015 | Chung | H01G 4/30 427/79 |
| 2015/0084487 | A1* | 3/2015 | Mori | H01G 4/248 336/200 |
| 2018/0025844 | A1 | 1/2018 | Sato et al. | |
| 2018/0068795 | A1* | 3/2018 | Park | H01G 4/2325 |
| 2018/0108479 | A1* | 4/2018 | Sato | H01G 4/12 |
| 2020/0152382 | A1 | 5/2020 | Sakurai et al. | |
| 2022/0093337 | A1 | 3/2022 | Han et al. | |

FOREIGN PATENT DOCUMENTS

| | | | |
|---|---|---|---|
| JP | 2020-167367 | A | 10/2020 |
| KR | 10-2014-0040547 | A | 4/2014 |
| KR | 10-2018-0042124 | A | 4/2018 |
| KR | 10-2022-0040918 | A | 3/2022 |

* cited by examiner 10
14
13
215
215
200
213
195
147
15
137
185
211
T
W
L

MULTILAYER CERAMIC CAPACITOR COMPRISING EXTERNAL ELECTRODES WITH A LONG BAND PORTION

RELATED APPLICATIONS

This application claims priority to and the benefit of Korean Patent Application No. 10-2023-0032402 filed in the Korean Intellectual Property Office on Mar. 13, 2023, the entire contents of which are incorporated herein by reference.

BACKGROUND

1. Technical Field

The present disclosure relates to a multilayer ceramic capacitor.

2. Description of the Related Art

Electronic components using ceramic materials include capacitors, inductors, piezoelectric elements, varistors, or thermistors. Among such ceramic electronic components, a multilayer ceramic capacitor (MLCC) may be used in various electronic devices due to its small size, high capacity, and easy mounting.

For example, the multilayer ceramic capacitor may be used for chip-type capacitors that are mounted in boards of various electronic products to charge or discharge electricity, including imaging devices such as liquid crystal displays (LCDs), plasma display panels (PDPs), and organic light-emitting diodes (OLEDs), computers, personal portable terminals, and smartphones.

Demand for multilayer ceramic capacitors having a smaller thickness than existing multilayer ceramic capacitors is increasing according to the recent trend of downsizing and thinning of electronic products. In particular, for multilayer ceramic capacitors whose width is 1.5 times or 2 times the thickness, the thickness is considerably smaller than the width, so there is a risk of physical damage such as generation of flex cracks when mounted on a board. Furthermore, when the structures of the external electrodes are different on the upper and lower surfaces of the ceramic body, defects may occur due to the presence of structurally weak portions due to structural non-uniformity, and the possibility of moisture penetration may increase.

SUMMARY

One aspect of the embodiments is to provide a multilayer ceramic capacitor with a reduced possibility of generating flex cracks.

Another aspect of the embodiments is to provide a multilayer ceramic capacitor having a lowered possibility of moisture penetration.

However, the objective of the present disclosure is not limited to the aforementioned one, and may be extended in various ways within the spirit and scope of the present disclosure.

A multilayer ceramic capacitor includes a ceramic body a length, a width, and a thickness that are preset, the ceramic body includes: a plurality of first and second internal electrodes having a dielectric layer therebetween and alternately extending from both end portions in the ceramic body into the ceramic body, and a first cover layer and a second cover layer disposed at both sides of ceramic body facing each other in a thickness direction of the ceramic body, first and second external electrodes that respectively may include: a connection electrode connected to the plurality of first and second internal electrodes, and a plating electrode covering the connection electrode, the first and second external electrodes may include: a body portion that covers both end surfaces spaced apart from each other along a length direction of the ceramic body, respectively, a first band portion extending from the body portion and covering a part of a first surface of the ceramic body in the thickness direction, and a second band portion covering a part of a second surface of the ceramic body facing the first surface and is longer than the first band portion, and a first cladding layer between the second band portion of the first external electrode, and the second band portion of the second external electrode, and the first cladding layer contacts the second cover layer.

A seed electrode layer may be between the second cover layer and the first external electrode and between the second cover layer and the second external electrode.

The seed electrode layer may be a sintered electrode layer.

A thickness $e_E$ of the seed electrode layer may be a distance along the thickness direction of the ceramic body between an external circumferential surface of the second cover layer and an external circumferential surface of the seed electrode layer. A thickness $t_B$ of the first cladding layer may be a distance along the thickness direction of the ceramic body between the external circumferential surface of the second cover layer and an external circumferential surface of the first cladding layer. A thickness $e_B$ of the second band portion may be a distance along the thickness direction of the ceramic body between the external circumferential surface of the seed electrode layer and an external circumferential surface of the second band portion. The thickness $t_B$ of the first cladding layer may be greater than or equal to the thickness e of the seed electrode layer and smaller than or equal to a sum $e_E+e_T$ of thicknesses of the seed electrode layer and the second band portion.

The body portion may include a connection portion connected to the plurality of first and second internal electrodes and a plated body portion covering the connection portion. A thickness $e_L$ of the plated body portion may be a distance along the length direction of the ceramic body between an external circumferential surface of the connection portion and an external circumferential surface of the plated body portion. A thickness $e_B$ of the second band portion may be greater than 3 μm and smaller than or equal to the thickness $e_L$ of the plated body portion.

A seed electrode layer may be between the second cover layer and the first external electrode and between the second cover layer and the second external electrode. The second band portion may include a connection band portion covering a part of the seed electrode layer and a plated band portion covering a remaining portion of the seed electrode layer and the connection band portion. A thickness $e_B$ of the plated band portion may be a distance along the thickness direction of the ceramic body between an external circumferential surface of the seed electrode layer and an external circumferential surface of the plated band portion. The thickness $e_L$ of the plated body portion may be larger than the thickness $e_B$ of the plated band portion.

The connection portion may be a sintered layer including copper (Cu).

The multilayer ceramic capacitor may further include a second cladding layer between the first band portion of the first external electrode and the first band portion of the second external electrode, and the second cladding layer may be on the first cover layer.

A thickness $t_T$ of the second cladding layer may be a distance along the thickness direction of the ceramic body between an external circumferential surface of the first cover layer and an external circumferential surface of the second cladding layer. A thickness of the first band portion may be a distance along the thickness direction of the ceramic body between the external circumferential surface of the first cover layer and an external circumferential surface of the first band portion. The thickness $t_T$ of the second cladding layer may be smaller than or equal to the thickness of the first band portion.

The first band portion may include a connection band portion covering a part of the first cover layer and a plated band portion covering the connection band portion.

An active region that may be a region comprising the plurality of first and second internal electrodes overlapping along the thickness direction of the ceramic body, and a margin region that may be a region between the active region and both end surfaces of the ceramic body. Here, a length of the margin region may be a distance along the length direction of the ceramic body between both end portions of the margin region. Here, a length of the first band portion may be a distance between an end surface of the ceramic body or imaginary extension thereof and the edge opposite the end surface of the ceramic body among edges of the first band portion. Here, a length of the second band portion may be a distance between the end surface of the ceramic body or imaginary extension thereof and the edge opposite the end surface of the ceramic body among edges of the second band portion. Here, a length of the first band portion may be smaller than a length of the margin region. Here, a length of the second band portion may be larger than a length of the margin region.

A seed electrode layer may be between the second cover layer and the first external electrode and between the second cover layer and the second external electrode. A length of the seed electrode layer may be a distance between the end surface of the ceramic body or imaginary extension thereof and the edge opposite to the end surface of the ceramic body among edges of the seed electrode layer. A length of the seed electrode layer may be larger than a length of the margin region.

A length of the second band portion may be larger than a length of the seed electrode layer.

The plating electrode may include a plurality of plating layers.

The plurality of plating layers may include a first plating layer including nickel (Ni), copper (Cu), palladium (Pd), gold (Au) or an alloy thereof, and a second plating layer covering the first plating layer and including tin (Sn).

The first cladding layer may include an insulating material or a ceramic material.

The first cladding layer may include an insulating material or a ceramic material.

The first band portion may include a first connection band portion on the ceramic body and a first plated band portion covering the first connection band portion. The second band portion may include a second connection band portion on the ceramic body and a second plated band portion covering the second connection band portion. A length of the second plated band portion may be longer than a length of the first plated band portion.

The first cladding layer may include an insulating material.

The first cladding layer may include a ceramic material.

According to a multilayer ceramic capacitor according to an embodiment, since the cladding layer is form between the external electrode and the lower cover layer of the ceramic body, the external electrode may be protected, and the generation of the flex crack due to the stress concentration may be suppressed.

In addition, according to a multilayer ceramic capacitor according to an embodiment, since a cladding layer is formed between the external electrode and the upper cover layer of the ceramic body, the external electrode may be protected and deterioration of reliability in moisture resistance due to moisture penetration may be suppressed.

DETAILED DESCRIPTION

Figure 1:
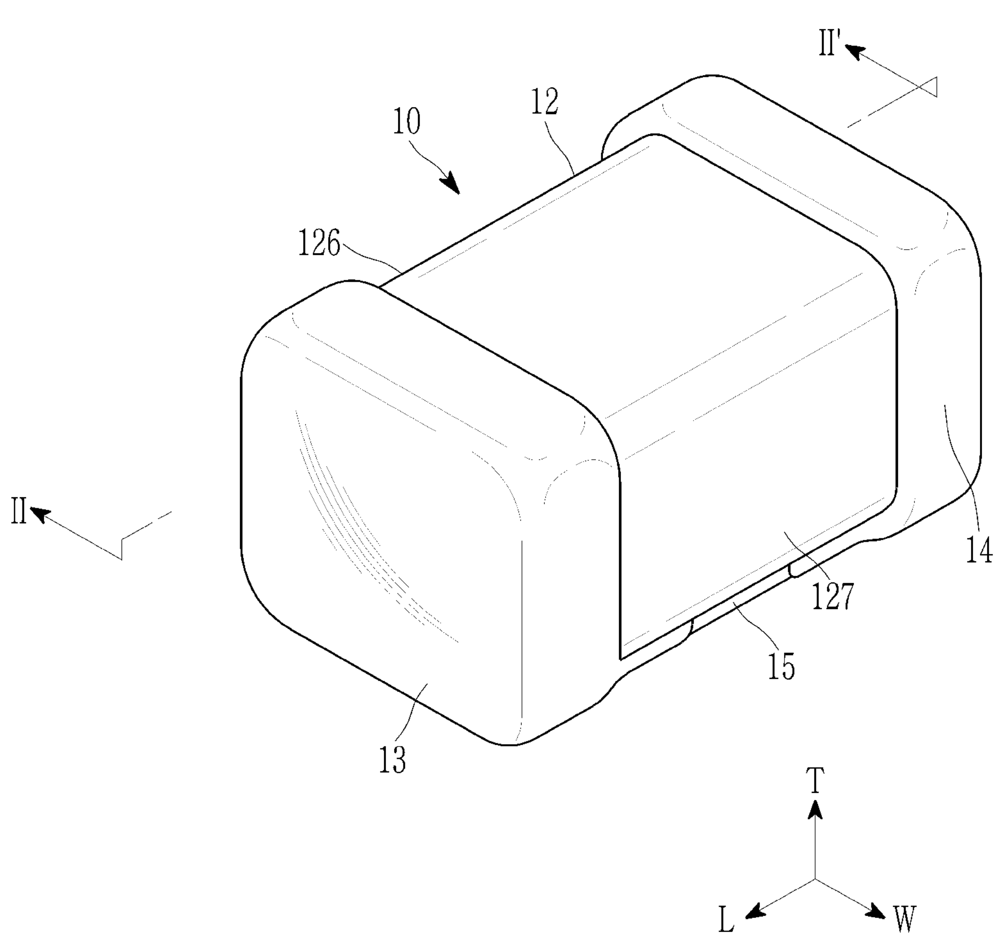
FIG. 1 is a perspective view schematically illustrating a multilayer ceramic capacitor according to an embodiment.

The present disclosure will be described more fully hereinafter with reference to the accompanying drawings, in which embodiments of the present disclosure are shown. The drawings and description are to be regarded as illustrative in nature and not restrictive. Like reference numerals designate like elements throughout the specification. In addition, some constituent elements are exaggerated, omitted, or briefly illustrated in the added drawings, and sizes of the respective constituent elements do not reflect the actual sizes.

The accompanying drawings are provided only in order to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including an ordinal number, such as first, second, etc., may be used to describe various elements, but the elements are not limited by the terms. The terms are only used to differentiate one constituent element from other constituent elements.

In addition, it will be understood that when an element such as a layer, film, region, area, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

Throughout the specification, it should be understood that the term "include", "comprise", "have", or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Furthermore, throughout the specification, "connected" does not only mean when two or more elements are directly connected, but also when two or more elements are indirectly connected through other elements, and when they are physically connected or electrically connected, and further, it may be referred to by different names depending on a position or function, and may also be referred to as a case in which respective parts that are substantially integrated are linked to each other.

Figure 2:
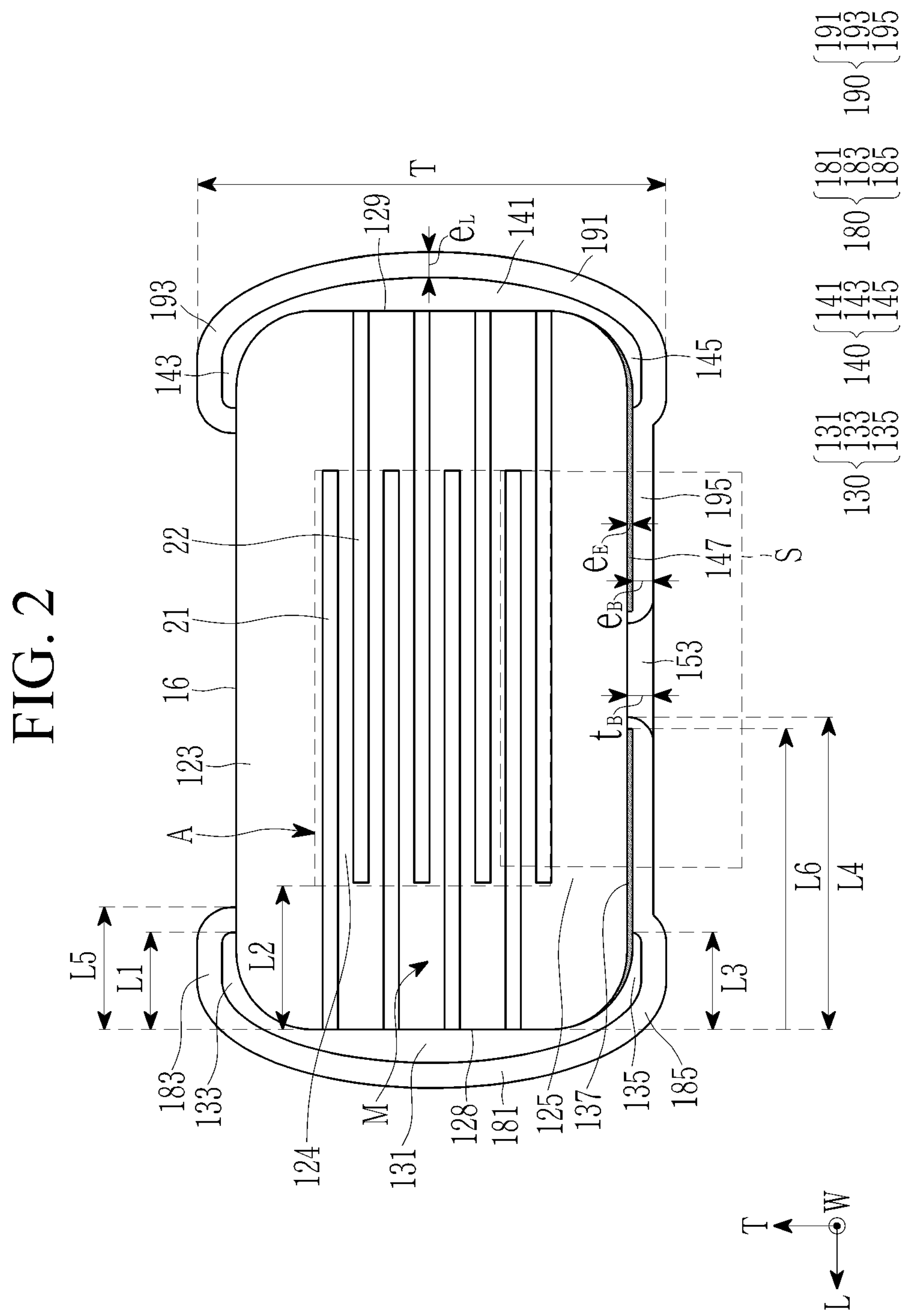
FIG. 2 is a cross-sectional view taken along a line II-II' in FIG. 1.
Figure 3:
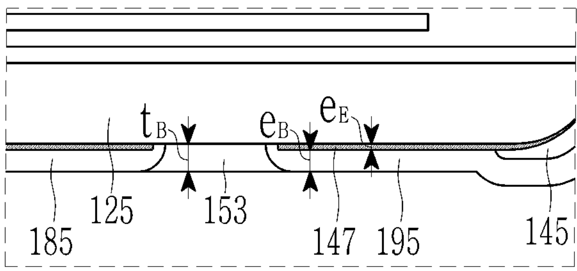
FIG. 3 is an enlarged view of a part S in FIG. 2.

FIG. 1 is a perspective view schematically illustrating a multilayer ceramic capacitor according to an embodiment. FIG. 2 is a cross-sectional view taken along a line II-II' of FIG. 1. FIG. 3 is an enlarged view of a part S of FIG. 2.

Referring to FIG. 1, FIG. 2 and FIG. 3, a multilayer ceramic capacitor 10 according to the present embodiment includes a ceramic body 12, first and second external electrodes 13 and 14, a plurality of first and second internal electrodes 21 and 22, and a cladding layer 15.

The ceramic body 12 may be formed by stacking a plurality of dielectric layers 124 in a thickness direction T and then sintering. Herein, each of the dielectric layers 124 adjacent to each other in the ceramic body 12 may be integrated with each other in a state where boundaries are unclear. The ceramic body 12 may have a substantially hexahedral shape with predetermined sizes of length, width, and thickness along directions crossing each other, but the present disclosure is not limited thereto.

In the present embodiment, for the purpose of better understanding and ease of description, both surfaces facing each other in the thickness direction T along which a dielectric layer 124 of the ceramic body 12 are stacked are defined as an upper surface 16 and a lower surface 17, respectively, both end surfaces facing each other in a length direction L of the ceramic body 12 connecting the upper surface 16 and the lower surface 17 are defined as first and second end surfaces 128 and 129, respectively, and surfaces facing each other in a width direction W perpendicularly crossing the first and second end surfaces 128 and 129 are defined as first and second side surfaces 126 and 127, respectively.

Meanwhile, a first cover layer 123 of a predetermined thickness may be provided on an upper portion of the internal electrode in the uppermost portion of the ceramic body 12, and a second cover layer 125 may be provided on a lower portion of the internal electrode in the lowermost portion. The first cover layer 123 and the second cover layer 125 may have the same composition as the dielectric layer 124, and at least one dielectric layer that does not include internal electrodes may be stacked on each of the uppermost internal electrode and the lowermost internal electrode of the ceramic body 12, respectively.

Referring to FIG. 2, the multilayer ceramic capacitor 10 according to the present embodiment includes an active region A and a margin region M.

The active region A is a region where the plurality of first and second internal electrodes 21 and 22 overlap along the thickness direction of the ceramic body 12, and the margin region M is a region between the active region A and the end surfaces 128 and 129 of the ceramic body 12.

The dielectric layer 124 may include a high dielectric constant ceramic material, e.g., $BaTiO_3$ (barium titanate)-based ceramic material, but the present disclosure is not limited thereto. Examples of $BaTiO_3$-based ceramic material may include $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$, or the like, in which Ca (calcium), Zr (zirconium), and the like are partially dissolved in $BaTiO_3$, but the present disclosure is not limited thereto.

In addition, the dielectric layer 124 may further include one or more of ceramic additives, organic solvents, plasticizers, binders, and dispersants. The ceramic additive may be a transition metal oxide or carbide, a rare earth element, magnesium (Mg), or aluminum (Al), or the like.

The first and second external electrodes 13 and 14 are disposed on both end portions of the ceramic body 12 in the length direction L, and may include first and second connection electrodes 130 and 140 and first and second plating electrodes 180 and 190.

The first and second connection electrodes 130 and 140 are connected to the plurality of first and second internal electrodes 21 and 22. The first and second connection electrodes 130 and 140 may be formed by printing a paste containing a conductive metal (e.g., nickel (Ni)). Accordingly, the first and second connection electrodes 130 and 140 are regions containing a sintering inhibitor in addition to the conductive metal. The conductive metal may include nickel (Ni), copper (Cu), palladium (Pd), gold (Au), or an alloy thereof, but the present disclosure is not limited thereto.

The first and second connection electrodes 130 and 140 include first and second connection portions 131 and 141, first connection band portions 133 and 143, and second connection band portions 135 and 145, respectively.

The first and second connection portions 131 and 141 cover the first and second end surfaces 128 and 129 of the ceramic body 12 in the length direction, respectively, and are electrically connected to exposed end portions of the first and second internal electrodes 21 and 22, respectively.

The first connection band portions 133 and 143 extend from the first and second connection portions 131 and 141, respectively, to cover a part of the upper surface 16 and parts of the first and second side surfaces 126 and 127, respectively, of the ceramic body 12.

A length L1 of the first connection band portions 133 and 143 may be smaller than a length L2 of the margin region M. Here, the length L1 of the first connection band portions 133 and 143 means a distance between an end surface of the ceramic body 12 or imaginary extension thereof and the edge opposite to the end surface of the ceramic body among edges of the first connection band portions 133 and 143, and the length L2 of the margin region M means a distance along the length direction of the ceramic body 12 between both end portions of the margin region M.

The second connection band portion 135 extends from the first connection portion 131 to cover a part of the lower surface 17 of the ceramic body 12 and the parts of the first and second side surfaces 126 and 127, respectively. The second connection band portion 145 extends from the second connection portion 141 to cover a part of the lower surface 17 of the ceramic body 12 and the parts of the first and second side surfaces 126 and 127, respectively.

A length L3 of the second connection band portions 135 and 145 may be smaller than the length L2 of the margin region M. Here, the length L3 of the second connection band portions 135 and 145 means a distance between the end surface of the ceramic body 12 or imaginary extension thereof and the edge opposite to the end surface of the ceramic body 12 among edges of the second connection band portions 135 and 145, and the length L2 of the margin region M means a distance along the length direction of the ceramic body 12 between both end portions of the margin region M.

The first and second plating electrodes 180 and 190 may be formed by plating a conductive metal on the first and second connection electrodes 130 and 140 and seed electrode layers 137 and 147. The conductive metal may include nickel (Ni), copper (Cu), palladium (Pd), gold (Au) or an alloy thereof, but the present disclosure is not limited thereto.

The first and second plating electrodes 180 and 190 include first and second body portions 181 and 191, first plated band portions 183 and 193, and second plated band portions 185 and 195, respectively.

The first body portion 181 covers the first connection portion 131 of the first connection electrode 130. The second body portion 191 covers the second connection portion 141 of the second connection electrode 140. The conductive metal is plated on the first and second connection portions 131 and 141 of the first and second connection electrodes 130 and 140 to grow not only in the length direction of the ceramic body 12 but also in the thickness direction, thereby forming the first and second body portions 181 and 191.

The first plated band portion 183 of the first plating electrode 180 extends from the first body portion 181 to cover the first connection band portion 133 of the first connection electrode 130. The first plated band portion 193 of the second plated electrode 190 extends from the second body portion 191 to cover the first connection band portion 143 of the second connection electrode 140.

The second plated band portion 185 of the first plating electrode 180 extends from the first body portion 181 and covers the second connection band portion 135 of the first connection electrode 130. The second plated band portion 195 of the second plating electrode 190 extends from the second body portion 191 and covers the second connection band portion 145 of the second connection electrode 140.

A length L4 of the second plated band portions 185 and 195 of the first and second plating electrodes 180 and 190 may be larger than a length L5 of first plated band portions 183 and 193. Here, the length L5 of the first plated band portions 183 and 193 means a distance between the end surface of the ceramic body 12 or imaginary extension thereof and the edge opposite to the end surface of the ceramic body 12 among edges of first plated band portions 183 and 193, and the length L4 of the second plated band portions 185 and 195 means a distance between the end surface of the ceramic body 12 or imaginary extension thereof and the edge opposite to the end surface of the ceramic body 12 among edges of the second plated band portions 185 and 195.

The seed electrode layers 137 and 147 may be printed between the lower surface 17 of the ceramic body 12 and the second plated band portions 185 and 195 of the first and second plating electrodes 180 and 190.

A length L6 of the seed electrode layers 137 and 147 may be larger than the length L2 of the margin region M. Here, the length L6 of the seed electrode layers 137 and 147 means a distance between the end surface of the ceramic body 12 or imaginary extension thereof and the edge opposite to the end surface of the ceramic body among edges of the seed electrode layers 137 and 147.

In the seed electrode layers 137 and 147, a portion close to the end surface of the ceramic body 12 is covered by the second connection band portions 135 and 145 of the first and second connection electrodes 130 and 140, and a conductive metal is plated on the remaining portion of the seed electrode layers 137 and 147. That is, the remaining portion of the seed electrode layers 137 and 147 is covered by the second plated band portions 185 and 195 of the first and second plating electrodes 180 and 190.

Since the second connection band portions 135 and 145 of the first and second connection electrodes 130 and 140 are covered by the second plated band portions 185 and 195 of the first and second plating electrodes 180 and 190, a portion in the seed electrode layers 137 and 147 close to the end surface of the ceramic body 12 is sequentially covered by the second connection band portions 135 and 145 of the first and second connection electrodes 130 and 140 and the second plated band portions 185 and 195 of the first and second plating electrodes 180 and 190. Therefore, this portion may be thicker than the portion covered only by the second plated band portions 185 and 195 of the first and second plating electrodes 180 and 190.

The seed electrode layers 137 and 147 may be formed by printing and sintering a paste containing a conductive metal (e.g., nickel (Ni)). That is, the seed electrode layers 137 and 147 is a sintered electrode layer. Accordingly, the seed electrode layers 137 and 147 are regions containing a sintering inhibitor in addition to the conductive metal. The second plated band portions 185 and 195 of the first and second plating electrodes 180 and 190 may be formed by plating a conductive metal on the seed electrode layers 137 and 147. Unlike the seed electrode layers 137 and 147, the second plated band portions 185 and 195 of the first and second plating electrodes 180 and 190 do not substantially contain components other than the conductive metal.

Since the ceramic body 12 is made of ceramic material while the external electrodes 13 and 14 are made of metal (e.g., nickel (Ni)), the difference in shrinkage rate between ceramic and metal during sintering may create a stress-concentrating zone on the ceramic body 12, which may result in flex cracks when the multilayer ceramic capacitor is mounted on a circuit board.

In this embodiment, the generation of the flex crack is suppressed by forming the cladding layer 15 on the lower surface 17 of the ceramic body 12. This will be explained in more detail below.

The cladding layer 15 may be formed on the lower surface 17 of the ceramic body 12. The cladding layer 15 may be made of an insulating material or a ceramic material. For example, the cladding layer 15 may include an epoxy resin and a barium titanate-based material, a lead composite perovskite-based material, or a strontium titanate-based material. The cladding layer 15 formed on the lower surface 17 will be referred to as a first cladding layer 153 hereinafter.

The first cladding layer 153 is provided between the second cover layer 125 and a first external electrode 13 and a second external electrode 14. Specifically, the first cladding layer 153 is provided in a region between an external circumferential surface of the second cover layer 125 intersecting with the thickness direction of the ceramic body 12 and the second plated band portion 185 of the first plating electrode 180 and the second plated band portion 195 of the second plating electrode 190.

A thickness $t_B$ of the first cladding layer 153 may be greater than or equal to a thickness e of the seed electrode layers 137 and 147, and may be smaller than or equal to a sum $e_B+e_E$ of the thickness $e_E$ of the seed electrode layers 137 and 147 and a thickness $e_B$ of the second plated band portions 185 and 195 of the first and second plating electrodes 180 and 190. Since the thickness $e_E$ of the seed electrode layers 137 and 147 is greater than 0 μm, it may be that $0\ \mu m < e_E \leq t_B \leq e_T + e_E$.

If the thickness $t_B$ of the first cladding layer 153 is smaller than the thickness $e_T$ of the seed electrode layers 137 and 147, it is difficult to cover the gap in the parts where the second plated band portions 185 and 195 contact the ceramic body 12.

If the thickness $t_B$ of the first cladding layer 153 is greater than a sum $e_T+e_E$ of the thickness $e_E$ of the seed electrode layers 137 and 147 and the thickness $e_B$ of the second plated band portions 185 and 195, the first cladding layer 153 may cover the second plated band portions 185 and 195. In this case, since the overall thickness T of the multilayer ceramic capacitor 10 increases, the volume allocation of the ceramic body 12 decreases, which may result in a loss of capacitance.

Here, the thickness $t_B$ of the first cladding layer 153 means a distance along the thickness direction of the ceramic body 12 between the external circumferential surface of the second cover layer 125 and an external circumferential surface of the first cladding layer 153. In addition, the thickness $e_E$ of the seed electrode layers 137 and 147 means a distance along the thickness direction of the ceramic body 12 between the external circumferential surface of the second cover layer 125 and external circumferential surfaces of the seed electrode layers 137 and 147. In addition, the thickness $e_B$ of the second plated band portions 185 and 195 means a distance along the thickness direction of the ceramic body 12 between the external circumferential surfaces of the seed electrode layers 137 and 147 and external circumferential surfaces of the second plated band portions 185 and 195.

The thickness $e_B$ of the second plated band portions 185 and 195 may be greater than 3 μm, and smaller than or equal to a thickness $e_L$ of the body portions 181 and 191 of the first and second plating electrodes 180 and 190. That is, it may be that $3\ \mu m < e_B \leq e_L$.

If the thickness $e_B$ of the second plated band portions 185 and 195 is smaller than 3 μm, the conductive metal may not be plated with a uniform thickness in the plating process, resulting in insufficient coverage of the plating layer.

If the thickness $e_B$ of the second plated band portions 185 and 195 is greater than the thickness $e_L$ of the body portions 181 and 191 of the first and second plating electrodes 180 and 190, the overall thickness T of the multilayer ceramic capacitor 10 increases, which may reduce the volume allocation of the ceramic body 12, resulting in a loss of capacitance.

The connection portions 131 and 141 of the first and second connection electrodes 130 and 140 may be a sintered layer that includes copper (Cu). That is, a conductive metal may be plated on the sintered layer of copper (Cu) to form the body portions 181 and 191 of the first and second plating electrodes 180 and 190.

The thickness $e_L$ of the body portions 181 and 191 may be greater than a thickness $e_T$ of the second plated band portions 185 and 195. That is, the body portions 181 and 191 of the first and second plating electrodes 180 and 190 may be formed thicker than the second plated band portions 185 and 195 formed over the seed electrode layers 137 and 147. Since the seed electrode layers 137 and 147 undergo an intermediate oxidation process due to a manufacturing method, such a difference in thickness may occur.

Figure 4:
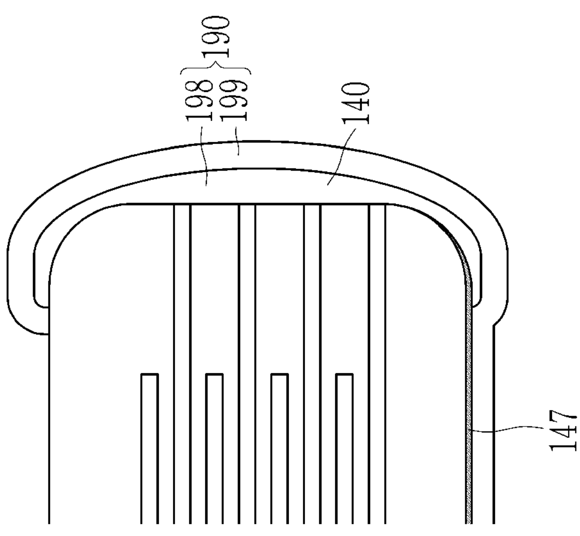
FIG. 4 is a partial cross-sectional view showing a multilayer ceramic capacitor according to another embodiment.
Figure 4:
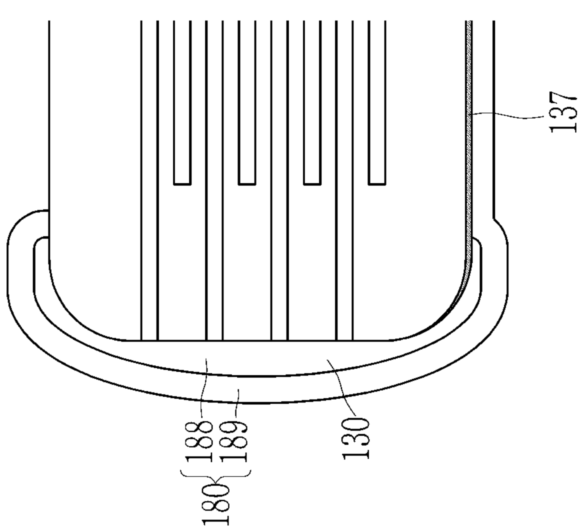
Figure 4:
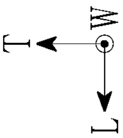

FIG. 4 is a partial cross-sectional view showing a multilayer ceramic capacitor according to another embodiment.

Referring to FIG. 4, the first plating electrode 180 may include a plurality of plating layers. That is, the first plating electrode 180 may include a first plating layer 188 and a second plating layer 189. The first plating layer 188 may include nickel (Ni), copper (Cu), palladium (Pd), gold (Au) or an alloy thereof. The second plating layer 189 may include tin (Sn) and covers the first plating layer 188. Another plating layer may be provided between the first plating layer 188 and the second plating layer 189. For example, the first plating electrode 180 may be formed in a combination, such as nickel (Ni), copper (Cu), nickel/copper (Ni/Cu), palladium/nickel (Pd/Ni), palladium/nickel/copper (Pd/Ni/Cu), copper/nickel/copper (Cu/Ni/Cu).

In some cases, an outermost plating layer may be made of tin (Sn). Since the tin plating layer has a relatively low melting point, it is possible to improve the ease of board mounting of the first and second external electrodes 13 and 14.

In general, the tin plating layer may be coupled to an electrode pad on a substrate through a solder including a tin-copper-silver (Sn—Cu—Ag) alloy paste. That is, the tin plating layer may be melted and bonded to the solder during a heat treatment (reflow) process.

The second plating electrode 190 may include a plurality of plating layers. That is, the second plating electrode 190 may include a first plating layer 198 and a second plating layer 199. The first plating layer 198 may include nickel (Ni), copper (Cu), palladium (Pd), gold (Au) or an alloy thereof. The second plating layer 199 may include tin (Sn) and covers the first plating layer 198. Another plating layer may be provided between the first plating layer 198 and the second plating layer 199. For example, the second plating electrode 190 may be formed in a combination, such as nickel (Ni), copper (Cu), nickel/copper (Ni/Cu), palladium/nickel (Pd/Ni), palladium/nickel/copper (Pd/Ni/Cu), copper/nickel/copper (Cu/Ni/Cu).

In some cases, an outermost plating layer may be made of tin (Sn). Since the tin plating layer has a relatively low melting point, it is possible to improve ease of mounting the first and second external electrodes 13 and 14 on a substrate.

In general, the tin plating layer may be coupled to an electrode pad on a substrate through a solder including a tin-copper-silver (Sn—Cu—Ag) alloy paste. That is, the tin plating layer may be melted and bonded to the solder during a heat treatment (reflow) process.

Figure 5:
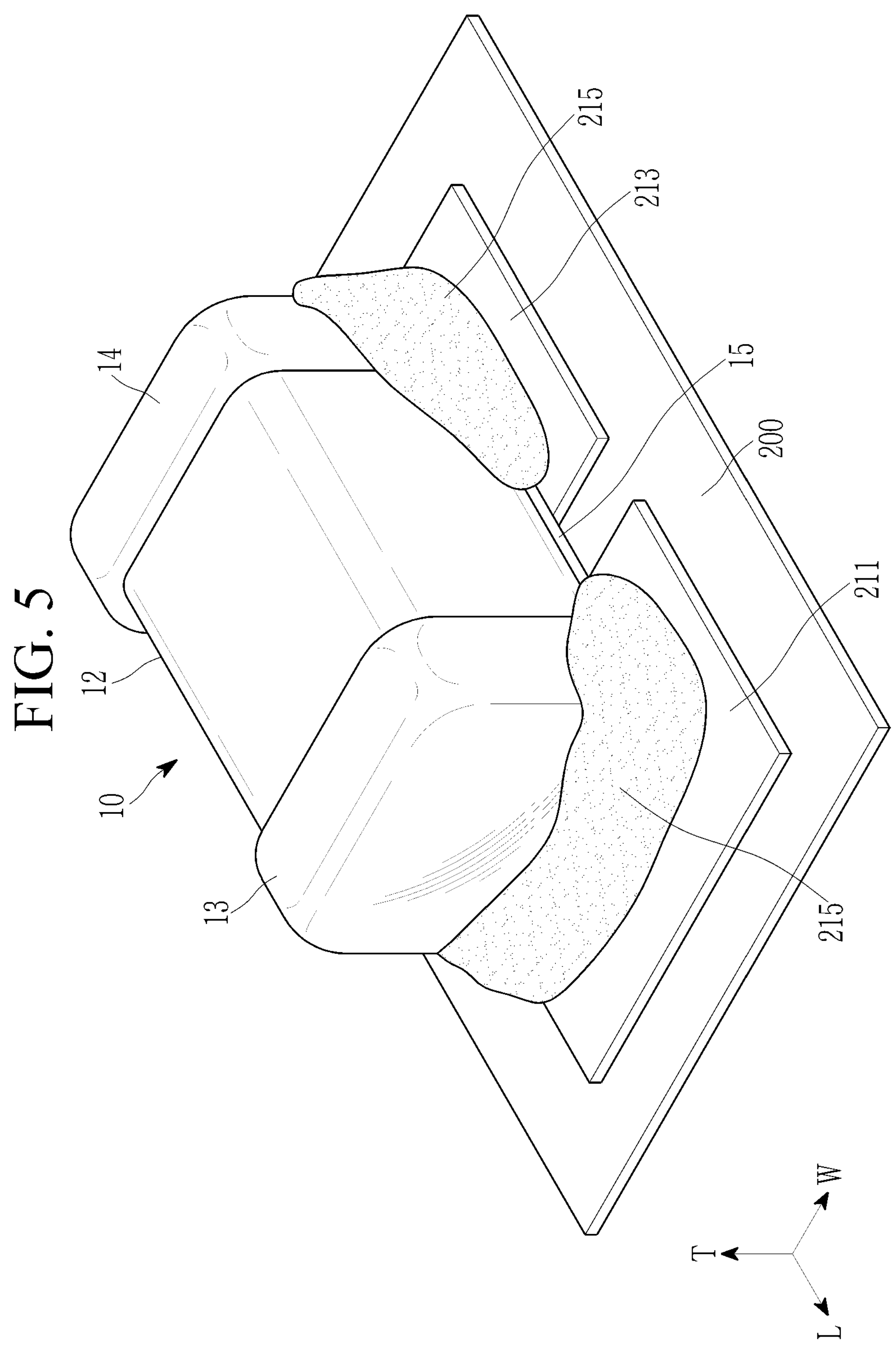
FIG. 5 illustrates a schematic perspective view showing a form in which the multilayer ceramic capacitor illustrated in FIG. 1 is mounted on a substrate.
Figure 6:
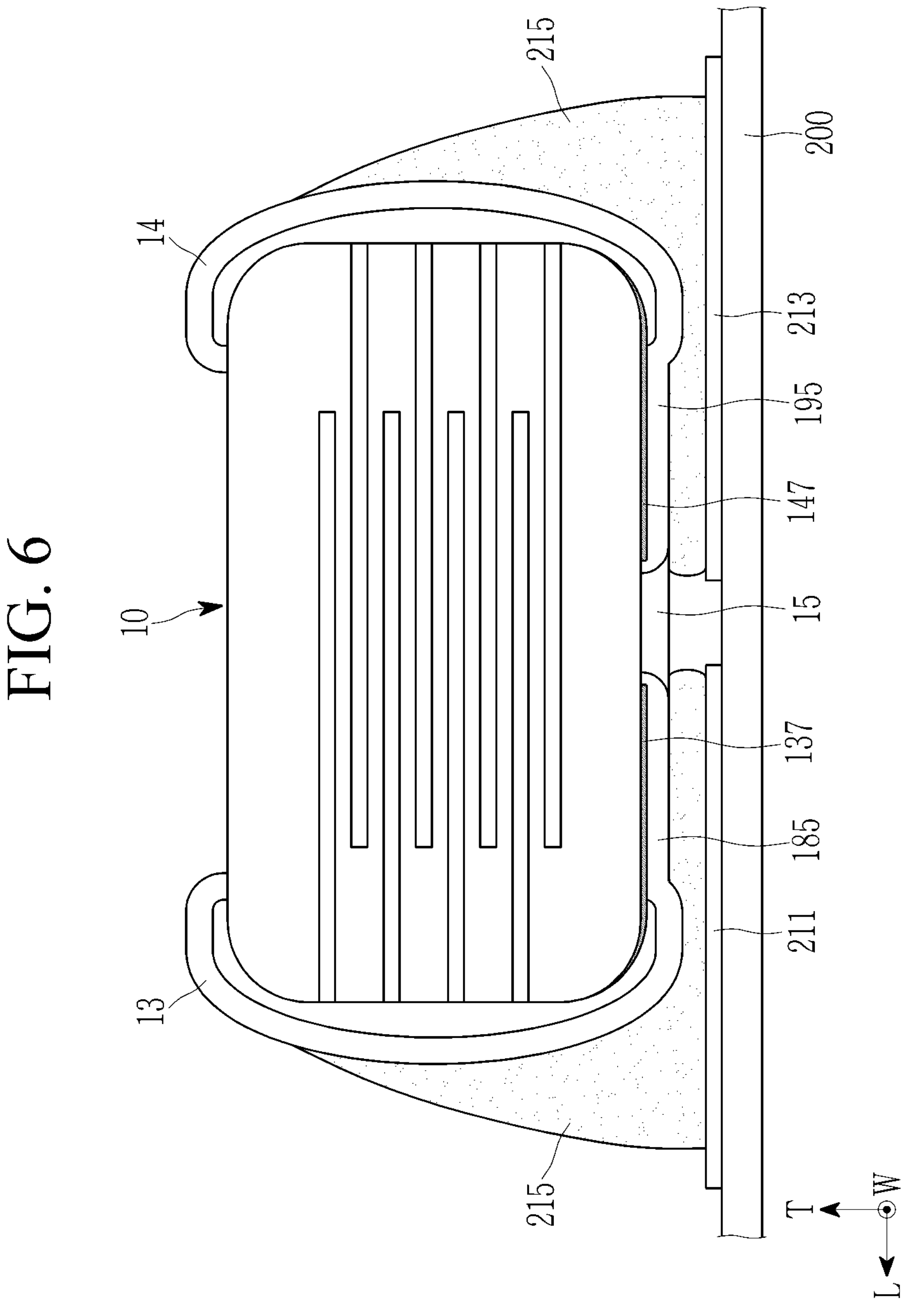
FIG. 6 illustrates a schematic cross-sectional view showing a form in which the multilayer ceramic capacitor illustrated in FIG. 1 is mounted on a substrate.

FIG. 5 illustrates a schematic perspective view showing a form in which the multilayer ceramic capacitor illustrated in FIG. 1 is mounted on a substrate. FIG. 6 illustrates a schematic cross-sectional view showing a form in which the multilayer ceramic capacitor illustrated in FIG. 1 is mounted on a board.

Referring to FIG. 5 and FIG. 6, the multilayer ceramic capacitor 10 is connected to first and second electrode pads 211 and 213 provided on an upper surface of a circuit board 200 through a conductive bonding member 215. That is, the multilayer ceramic capacitor 10 may be mounted on the circuit board 200 through the first and second electrode pads 211 and 213.

The first and second electrode pads 211 and 213 may be spaced apart from each other on the upper surface of the circuit board 200. The second plated band portions 185 and 195 of the first and second external electrodes 13 and 14 of the multilayer ceramic capacitor 10 may be secured to the circuit board 200 using the conductive bonding member 215 while disposed in contact with the first and second electrode pads 211 and 213. On the other hand, the conductive bonding member 215 may also cover the body portions 181 and 191 of the first and second external electrodes 13 and 14. Accordingly, the multilayer ceramic capacitor 10 may be electrically connected to the first and second electrode pads 211 and 213 of the circuit board 200. The conductive bonding member 215 may include, for example, solder.

In this embodiment, each of the first and second external electrodes 13 and 14 of the multilayer ceramic capacitor 10 is mounted on the circuit board 200 by being fixed to the first and second electrode pads 211 and 213 by the conductive bonding member 215.

When a typical multilayer ceramic capacitor is mounted on the circuit board, if the board bends, stresses may be concentrated at an end portion of the band portion of the external electrode, which can cause flex cracks to form and propagate. In this embodiment, it is possible to suppress the generation of the flex cracks by placing the cladding layer at a region where stresses are concentrated during mounting. That is, according to the present embodiment, when the multilayer ceramic capacitor 10 is mounted on the circuit board 200, even if stresses are concentrated at the ends of the band portions 185 and 195 as the board bends, the resistance to stress is large due to the presence of the cladding layer. Therefore, according to the present embodiment, the occurrence of flex cracks may be prevented.

Unlike the multilayer ceramic capacitor according to the present embodiment, if the cladding layer is not provided, when the multilayer ceramic capacitor is mounted on the circuit board, if the board bends, stresses may be concentrated at the ends of the band portions of the external electrodes, resulting in fracture and, consequently, flex cracks.

Figure 7:
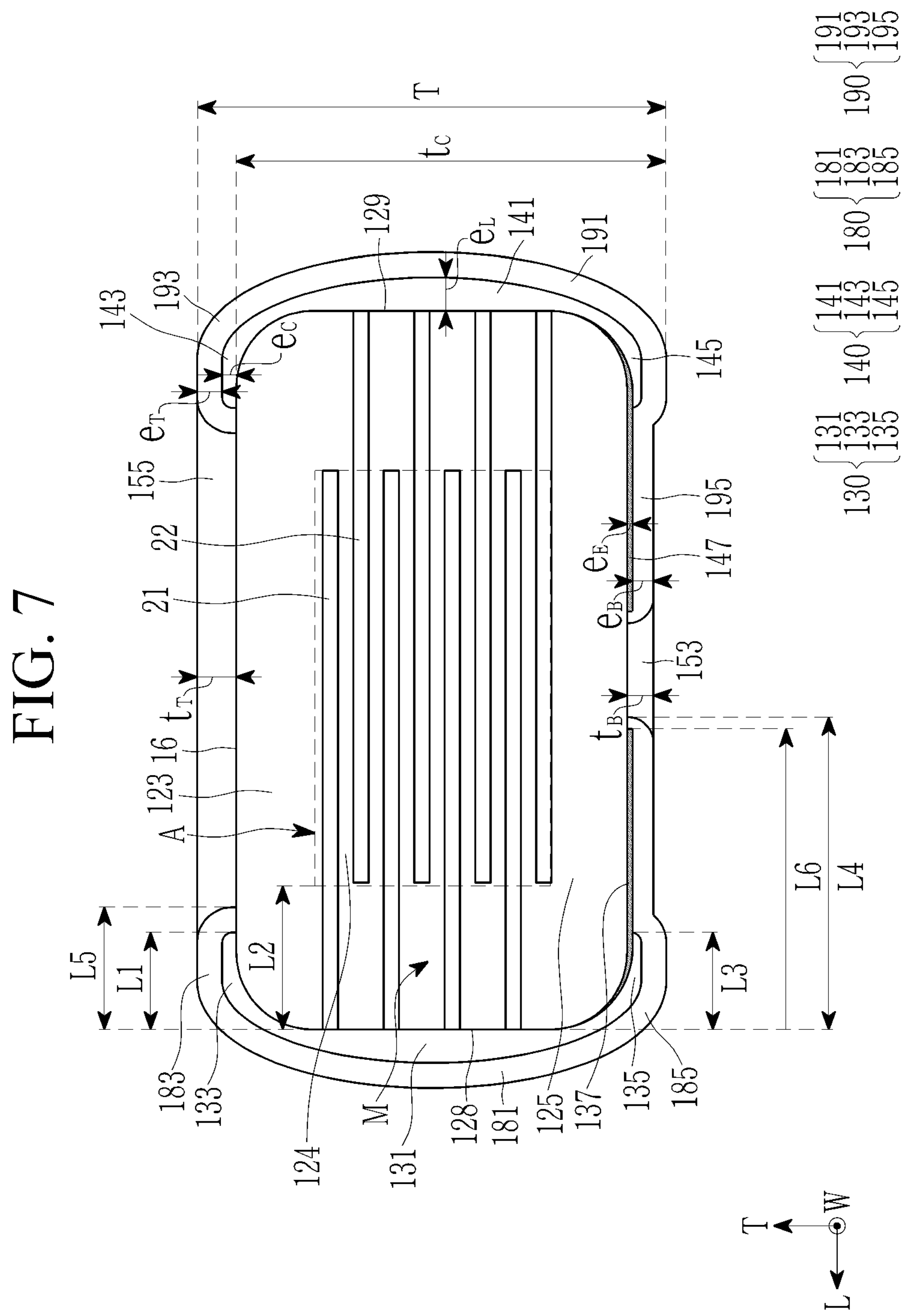
FIG. 7 is a schematic cross-sectional view showing a multilayer ceramic capacitor according to still another embodiment.

FIG. 7 is a schematic cross-sectional view showing a multilayer ceramic capacitor according to still another embodiment.

Referring to FIG. 7, a multilayer ceramic capacitor includes a first cladding layer 153 and a second cladding layer 155. Since the first cladding layer 153 is the same as that disclosed in the foregoing embodiment, a further description thereof will not be provided here again.

The second cladding layer 155 may be formed on the upper surface 16 of the ceramic body 12, and as is the case with the first cladding layer 153, may be made of an insulating material or a ceramic material.

The second cladding layer 155 is provided between the first cover layer 123 and the first external electrode 13 and the second external electrode 14. Specifically, the second cladding layer 155 is provided in a region between an external circumferential surface of the first cover layer 123 along the thickness direction of the ceramic body 12 and a first plated band portion 183 of the first plating electrode 180 and a first plated band portion 193 of the second plating electrode 190.

The second cladding layer 155 is not formed higher than the first plated band portions 183 and 193 of the first and second plating electrodes 180 and 190.

That is, a thickness $t_T$ of the second cladding layer 155 may be smaller than or equal to a sum $e_T+e_C$ of the thickness $e_T$ of the first plated band portions 183 and 193 of the first and second plating electrodes 180 and 190 and a thickness $e_C$ of the first connection band portions 133 and 143 of the first and second connection electrodes 130 and 140.

Here, the thickness $t_T$ of the second cladding layer 155 means a distance along the thickness direction of the ceramic body 12 between the external circumferential surface of the first cover layer 123 and an external circumferential surface of the second cladding layer 155. In addition, a thickness $e_C$ of the first connection band portions 133 and 143 means a distance along the thickness direction of the ceramic body 12 between the external circumferential surface of the first cover layer 123 and external circumferential surfaces of the first connection band portions 133 and 143. In addition, a thickness $e_T$ of the first plated band portions 183 and 193 means a distance along the thickness direction of the ceramic body 12 between the external circumferential surfaces of the first connection band portions 133 and 143 and the external circumferential surfaces of the first plated band portions 183 and 193.

In other words, the thickness $t_T$ of the second cladding layer 155 may be smaller than or equal to a value obtained by subtracting a height $t_C$ of the upper surface 16 of the ceramic body 12 from the overall thickness T of the multilayer ceramic capacitor 10. That is, it may be that $0\ \mu m < t_T \leq T - t_C$.

If the second cladding layer 155 is formed higher than first plated band portions 183 and 193 of the first and second plating electrodes 180 and 190, the overall thickness ($T=t_T+t_C$) of the multilayer ceramic capacitor 10 increases, which may reduce the volume allocation of the ceramic body 12, resulting in a loss of capacitance.

The lengths, widths, and thicknesses disclosed herein may be obtained by microscopy such as optical microscopy and electron microscopy (e.g., scanning electron microscopy). Other methods and/or tools appreciated by one of ordinary skill in the art, even if not described in the present disclosure, may also be used.

As described above, according to the multilayer ceramic capacitor according to the present embodiment, the second cladding layer 155 is provided on the upper surface 16 of the ceramic body 12, and the second cladding layer 155 is not formed higher than the band portions 183 and 193 of the first and second external electrodes 13 and 14. Thus, according to a multilayer ceramic capacitor according to the present embodiment, the band portions 183 and 193 of the first and second external electrodes 13 and 14 are prevented from protruding or are made to minimally protrude, thereby increasing their planarity to prevent the occurrence of defects and improve reliability in moisture resistance.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A multilayer ceramic capacitor, comprising:

a ceramic body with a length, a width, and a thickness that are preset, the ceramic body including:

a plurality of first and second internal electrodes having a dielectric layer therebetween and alternately extending from both end portions of the ceramic body into the ceramic body, and a first cover layer and a second cover layer disposed at both sides of ceramic body facing each other in a thickness direction of the ceramic body;

first and second external electrodes that respectively comprises:

a connection electrode connected to the plurality of first and second internal electrodes, and a plating electrode covering the connection electrode;

the first and second external electrodes includes:

a body portion that covers both end surfaces spaced apart from each other along a length direction of the ceramic body, a first band portion extending from the body portion and covering a part of a first surface of the ceramic body in the thickness direction, and a second band portion covering a part of a second surface of the ceramic body facing the first surface and is longer than the first band portion, the second band portion comprising a connection band portion and a plated band portion;

a first cladding layer between the second band portion of the first external electrode and the second band portion of the second external electrode, and the first cladding layer contacts the second cover layer; and a seed electrode layer between the second cover layer and the first external electrode, wherein:

the connection band portion covers a portion of the seed electrode layer, and the plated band portion covers the connection band portion and a remaining portion of the seed electrode layer.

2. The multilayer ceramic capacitor of claim 1, wherein the seed electrode layer is disposed between the second cover layer and the second external electrode.

3. The multilayer ceramic capacitor of claim 2, wherein the seed electrode layer is a sintered electrode layer.

4. The multilayer ceramic capacitor of claim 2, wherein:

a thickness $e_E$ of the seed electrode layer is a distance along the thickness direction of the ceramic body between an external circumferential surface of the second cover layer and an external circumferential surface of the seed electrode layer;

a thickness $t_B$ of the first cladding layer is a distance along the thickness direction of the ceramic body between the external circumferential surface of the second cover layer and an external circumferential surface of the first cladding layer;

a thickness $e_B$ of the second band portion is a distance along the thickness direction of the ceramic body between the external circumferential surface of the seed electrode layer and an external circumferential surface of the second band portion; and the thickness $t_B$ of the first cladding layer is greater than or equal to the thickness er of the seed electrode layer and smaller than or equal to a sum $e_E+e_B$ of thicknesses of the seed electrode layer and the second band portion.

5. The multilayer ceramic capacitor of claim 1, wherein:

the body portion comprises a connection portion connected to the plurality of first and second internal electrodes and a plated body portion covering the connection portion;

a thickness $e_L$ of the plated body portion is a distance along the length direction of the ceramic body between an external circumferential surface of the connection portion and an external circumferential surface of the plated body portion; and a thickness $e_B$ of the second band portion is greater than 3 μm and smaller than or equal to the thickness $e_L$ of the plated body portion.

6. The multilayer ceramic capacitor of claim 5, wherein the seed electrode layer is disposed between the second cover layer and the second external electrode, wherein:

the connection band portion overlaps the seed electrode layer in a thickness direction, a thickness es of the plated band portion is a distance along the thickness direction of the ceramic body between an external circumferential surface of the seed electrode layer and an external circumferential surface of the plated band portion, and the thickness $e_L$ of the plated body portion is greater than the thickness es of the plated band portion.

7. The multilayer ceramic capacitor of claim 5, wherein the connection portion is a sintered layer comprising copper (Cu).

8. The multilayer ceramic capacitor of claim 1, further comprising a second cladding layer between the first band portion of the first external electrode and the first band portion of the second external electrode, and the second cladding layer is on the first cover layer.

9. The multilayer ceramic capacitor of claim 8, wherein:

a thickness $t_T$ of the second cladding layer is a distance along the thickness direction of the ceramic body between an external circumferential surface of the first cover layer and an external circumferential surface of the second cladding layer;

a thickness of the first band portion is a distance along the thickness direction of the ceramic body between the external circumferential surface of the first cover layer and an external circumferential surface of the first band portion; and the thickness $t_T$ of the second cladding layer is smaller than or equal to the thickness of the first band portion.

10. The multilayer ceramic capacitor of claim 8, wherein the first band portion comprises a connection band portion covering a part of the first cover layer and a plated band portion covering the connection band portion.

11. The multilayer ceramic capacitor of claim 8, wherein the first cladding layer includes an insulating material or a ceramic material.

12. The multilayer ceramic capacitor of claim 1, further comprising:

an active region that is a region comprising the plurality of first and second internal electrodes overlapping along the thickness direction of the ceramic body; and a margin region that is a region between the active region and both end surfaces of the ceramic body, wherein a length of the margin region is a distance along the length direction of the ceramic body between both end portions of the margin region, wherein a length of the first band portion is a distance between an end surface of the ceramic body or imaginary extension thereof and the edge opposite the end surface of the ceramic body among edges of the first band portion, wherein a length of the second band portion is a distance between the end surface of the ceramic body or imaginary extension thereof and the edge opposite the end surface of the ceramic body among edges of the second band portion, wherein a length of the first band portion is smaller than a length of the margin region, and wherein a length of the second band portion is greater than a length of the margin region.

13. The multilayer ceramic capacitor of claim 12, wherein the seed electrode layer is disposed between the second cover layer and the second external electrode, wherein a length of the seed electrode layer is a distance between the end surface of the ceramic body or imaginary extension thereof and the edge opposite to the end surface of the ceramic body among edges of the seed electrode layer; and a length of the seed electrode layer is greater than a length of the margin region.

14. The multilayer ceramic capacitor of claim 13, wherein a length of the second band portion is greater than a length of the seed electrode layer.

15. The multilayer ceramic capacitor of claim 1, wherein the plating electrode comprises a plurality of plating layers.

16. The multilayer ceramic capacitor of claim 15, wherein the plurality of plating layers comprises:

a first plating layer comprising nickel (Ni), copper (Cu), palladium (Pd), gold (Au) or an alloy thereof; and a second plating layer covering the first plating layer and comprising tin (Sn).

17. The multilayer ceramic capacitor of claim 1, wherein the first cladding layer includes an insulating material or a ceramic material.

18. The multilayer ceramic capacitor of claim 1, wherein:

the first band portion comprises a first connection band portion on the ceramic body and a first plated band portion covering the first connection band portion, the second band portion comprises a second connection band portion on the ceramic body and a second plated band portion covering the second connection band portion, and a length of the second plated band portion is longer than a length of the first plated band portion.

19. The multilayer ceramic capacitor of claim 18, wherein the first cladding layer includes an insulating material.

20. The multilayer ceramic capacitor of claim 18, wherein the first cladding layer includes a ceramic material.

* * * * *